G. LIMBACH.
HORSESHOE.
APPLICATION FILED DEC. 13, 1909.
957,691.
Patented May 10, 1910.
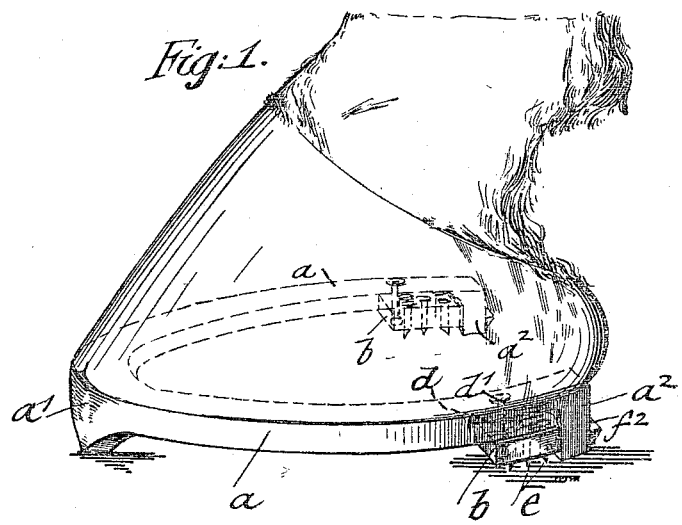
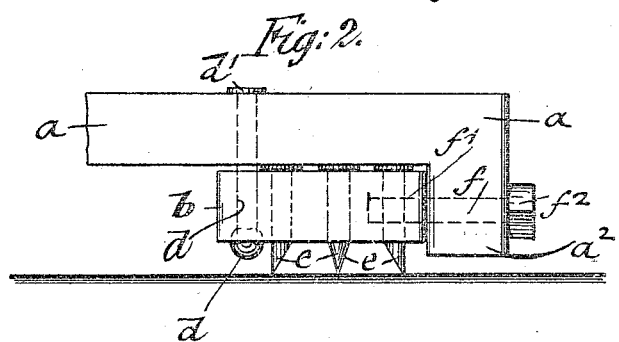
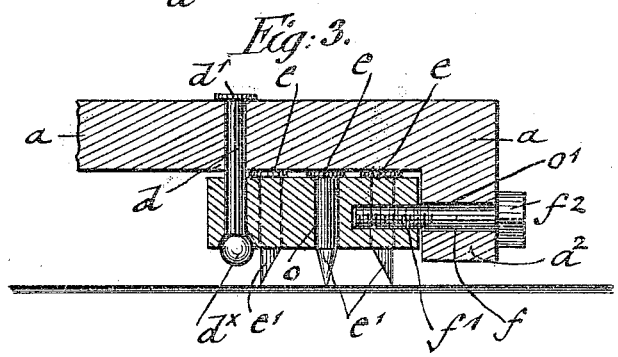
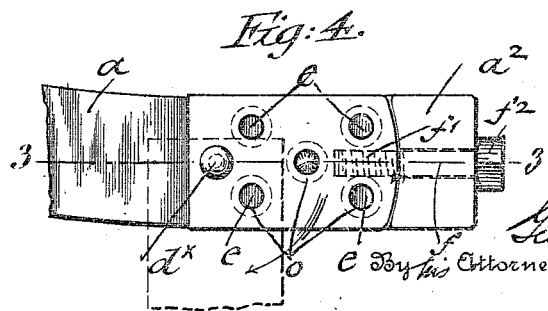
Witnesses:
R. Lichtenstein.
L. J. Murphy
Inventor
George Limbach
By his Attorneys
Foeller Foeller

UNITED STATES PATENT OFFICE.

GEORGE LIMBACH, OF NEW YORK, N. Y.

HORSESHOE.

957,691.  Specification of Letters Patent.  Patented May 10, 1910.

Application filed December 13, 1909. Serial No. 532,795.

*To all whom it may concern:*

Be it known that I, GEORGE LIMBACH, a citizen of the United States of America, residing in New York, in the borough of the Bronx, county and State of New York, have invented certain new and useful Improvements in Horseshoes, of which the following is a specification.

This invention relates to an improved auxiliary calk for horseshoes so that the slipping of the horses on ice or sleet-covered streets can be effectively prevented by giving them a good and reliable foothold on the street; and for this purpose the invention consists of a horseshoe to the rear-calks of which are applied auxiliary calks provided with interchangeable pins, and means for holding the auxiliary calks securely in position under the horseshoe and adjacent to the rear-calks of the same.

The invention consists further of the construction of the auxiliary calk as will be fully described hereinafter and finally pointed out in the claims.

In the accompanying drawings, Figure 1 represents a perspective view of a horseshoe with my improved auxiliary calk attachment, Fig. 2 is a detail side-elevation of a rear-calk of a horseshoe with my improved auxiliary calks in position thereon, Fig. 3 is a vertical longitudinal section on line 3, 3, Fig. 4, and Fig. 4 is a bottom-view of Fig. 3.

Similar letters of reference indicate corresponding parts throughout the several views.

Referring to the drawings, $a$ represents a horseshoe, $a^1$ the toe and $a^2$ the rear-calks of the same. On the rear part of each arm of the horseshoe, adjacent to the rear-calks $a^2$ are arranged auxiliary calks $b$, which are made of rectangular blocks, each of which is suspended from the shoe $a$ by a pin $d$, that is provided with an enlarged head $d^x$ at its lower end and which is passed through a hole in the forward end of the auxiliary calk $b$ and a hole alined therewith in the shoe, as shown in Figs. 2 and 3. The suspension-pin $d$ is upset at its upper end $d^1$ so as to be permanently connected thereby with the shoe $a$. The auxiliary calk $b$ is further provided with a number of vertical holes $o$ into which are inserted headed anti-slipping pins $e$, which are tapered or beveled at their lower ends so as to form thereby sharp points $e^1$, that extend below the auxiliary calks and heel-calks of the shoe, as shown in Fig. 3. The rear-end of the auxiliary calk $b$ is rigidly secured in position by means of a screw-bolt $f$ the threaded shank of which is passed through a horizontal hole $o^1$ in the rear-calk $a^2$ and screwed into an interiorly-threaded socket $f^1$ in the rear-end of the auxiliary calk $b$. The screw $f$ is provided with a square or other shaped head $f^2$ so as to permit the screwing in of the threaded shank of the bolt $f$ into the socket $f^1$, or the unscrewing of the same for releasing the auxiliary calk $b$. When the screw-bolt $f$ is unscrewed and released from the auxiliary calk $b$, the latter can be moved sidewise on the suspension pin $d$ into a position at right angles to the rear-part of the shoe so as to permit the dropping in of new pins and the exchange of worn out pins for new pins. The inner faces of the rear-calks and the adjacent faces of the auxiliary calks are made arc-shaped and concentric with the suspension-pins, as shown in Fig. 4.

When the streets are not covered with ice, the auxiliary calk is retained in position on the shoe, but without inserting any anti-slipping pins into the same. But when the streets are covered with ice and slippery, the fastening screw-bolts are unscrewed from the auxiliary calks $b$ the latter swung sidewise on the suspension-pins $d$ and a set of anti-slipping pins dropped into the holes of the auxiliary calks. This can be done by the driver while he is on his regular trip in case cold weather sets in and the streets become slippery. For this purpose the driver carries two sets of pins with him, also a key for permitting the unscrewing of the fastening bolts and the dropping of the pointed pins into the auxiliary calks after moving the same in outward direction on the shoe, after which the auxiliary calks are returned into position under the shoe, and locked to the rear-calks by turning the fastening screw-bolts into the threaded sockets of the auxiliary calks. The heads of the anti-slipping pins are held firmly in position between the auxiliary calks and the shoe, so that they cannot give while in use. When the roads are not slippery, after the melting of the ice or sleet, the anti-slipping pins $e$ are removed from the auxiliary calks and the latter replaced in position by the fastening screw-bolts until the weather changes and it should be necessary again to insert the headed pins, which can be done either before starting out with the team or while on the road with the same.

By the auxiliary calks and interchangeable anti-slipping pins a convenient and inexpensive means is obtained for preventing accidents to horses on slippery streets, without requiring the pointing up of the rear-calks by the blacksmith, as heretofore.

Having thus described my invention, I claim as new and desire to secure by Letters Patent:

1. The combination, with the rear-calks of a horse-shoe, of auxiliary calks suspended from the rear-portions of the shoe, and provided with vertical holes, headed and pointed anti-slipping pins inserted into said holes, and means attached to the rear-calks for securing the auxiliary calks in position on the rear-calks of the shoe.

2. The combination, with the rear-calks of a horseshoe, of auxiliary calks having vertical holes suspended from the shoe, headed anti-slipping pins inserted into the holes of the auxiliary calks, and screw-bolts passing through the rear-calks and engaging threaded sockets of the auxiliary calks.

3. The combination, with the rear-calks of a horse-shoe, of auxiliary calks, headed pins for suspending the front-ends of the rear-calks from the shoe, headed and pointed anti-slipping pins inserted into vertical holes of the auxiliary calks and extending below the same and the rear-calks and heel-calks, and screw-bolts extending through the heel-calks and engaging threaded sockets of the auxiliary calks.

4. The combination, with the rear-calks of a horse-shoe of auxiliary calks provided with vertical holes, headed suspended pins passing through the rear-parts of the shoe and the front-ends of the auxiliary calks, headed anti-slipping pins inserted into the holes of the auxiliary calks and means for securing the auxiliary calks to the rear-calks, the adjacent faces of the auxiliary calks and rear-calks being concentric with the suspension pins for permitting the sidewise swinging of the auxiliary calks for inserting, removing or exchanging the anti-slipping pins.

5. An auxiliary calk formed of a rectangular block pivotally attached on the rear-part of an arm of the horseshoe and provided with vertical holes, headed and pointed anti-slipping pins inserted into the holes of the auxiliary calk, and means attached to said block and said adjacent arm only for holding said block against said rear-part.

In testimony, that I claim the foregoing as my invention, I have signed my name in presence of two subscribing witnesses.

GEORGE LIMBACH.

Witnesses:
 AUG. G. KLOPPER,
 PAUL GOEPEL.